United States Patent
Laurent

(10) Patent No.: US 12,461,812 B2
(45) Date of Patent: Nov. 4, 2025

(54) ECC POWER CONSUMPTION OPTIMIZATION IN MEMORIES

(71) Applicant: Micron Technology, Inc., Boise, ID (US)

(72) Inventor: Christophe Vincent Antoine Laurent, Agrate Brianza (IT)

(73) Assignee: Micron Technology, Inc., Boise, ID (US)

( * ) Notice: Subject to any disclaimer, the term of this patent is extended or adjusted under 35 U.S.C. 154(b) by 21 days.

(21) Appl. No.: 18/699,834

(22) PCT Filed: Oct. 18, 2021

(86) PCT No.: PCT/IB2021/022225
§ 371 (c)(1),
(2) Date: Apr. 9, 2024

(87) PCT Pub. No.: WO2023/067367
PCT Pub. Date: Apr. 27, 2023

(65) Prior Publication Data
US 2024/0411642 A1    Dec. 12, 2024

(51) Int. Cl.
G06F 11/10 (2006.01)
(52) U.S. Cl.
CPC ...... G06F 11/1048 (2013.01); G06F 11/1068 (2013.01)
(58) Field of Classification Search
None
See application file for complete search history.

(56) References Cited

U.S. PATENT DOCUMENTS

| 8,635,514 B2 | 1/2014 | Bueb et al. |
| 9,654,143 B2 | 5/2017 | Sole et al. |

(Continued)

OTHER PUBLICATIONS

M. Ramya and S. Preethi, "Detection and correction of soft errors in memory system," 2013 International Conference on Advanced Computing and Communication Systems, Coimbatore, India, 2013, pp. 1-6, (Year: 2013).*

(Continued)

*Primary Examiner* — Daniel F. McMahon
(74) *Attorney, Agent, or Firm* — Brooks, Cameron & Huebsch, PLLC

(57) ABSTRACT

The present disclosure relates to a memory device comprising an array including a plurality of memory cells and an operating unit, the operating unit comprising an encoding unit configured to store user data in a plurality of memory cells of the memory array and to store parity data associated with the user data in a number of parity cells of the memory array, the operating unit further comprising a decoding unit in turn comprising a syndrome generating unit configured to calculate an ECC syndrome from the stored user data and parity data, wherein the syndrome generating unit comprises a plurality of circuit portions, each circuit portion being configured to calculate a respective syndrome portion of the ECC syndrome. The operating unit is configured to activate a first circuit portion of the syndrome generating unit for calculating a first syndrome portion, and, based on the calculated first syndrome portion, decide whether to activate or not to activate a second circuit portion for the calculation of a second syndrome portion. Related methods and systems are also herein disclosed.

23 Claims, 7 Drawing Sheets

(56) References Cited

U.S. PATENT DOCUMENTS

| | | |
|---|---|---|
| 9,800,271 B2 | 10/2017 | Jung et al. |
| 2014/0068391 A1 | 3/2014 | Goel et al. |
| 2017/0262332 A1 | 9/2017 | Barndt et al. |
| 2020/0192754 A1* | 6/2020 | Cho .................. H03M 13/1575 |
| 2020/0310911 A1 | 10/2020 | Fu et al. |
| 2021/0083687 A1* | 3/2021 | Lee ..................... H03M 13/116 |

OTHER PUBLICATIONS

International Search Report and Written Opinion from related International Application No. PCT/IB2021/022225, dated Jul. 7, 2022, 10 pages.

\* cited by examiner

ECC POWER CONSUMPTION OPTIMIZATION IN MEMORIES

PRIORITY INFORMATION

This application is a U.S. National Stage Application under 35 U.S.C. § 371 of International Application Number PCT/IB2021/022225, filed on Oct. 18, 2021, the contents of which are incorporated herein by reference.

TECHNICAL FIELD

The present disclosure relates generally to the management and operation of an array of memory cells, and more particularly to devices and methods to optimize the performances of memories having Error Correction Code (ECC) protection in order to reduce ECC power consumption.

BACKGROUND

Memory devices are used in many electronic systems such as mobile phones, personal digital assistants, laptop computers, digital cameras and the like. Various types of memories are used in memory devices, including random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Nonvolatile memories retain their contents when power is switched off, making them good choices in memory devices for storing information that is to be retrieved after a system power-cycle. In particular, nonvolatile memory cells may maintain their stored logic state for extended periods of time even in the absence of an external power source.

The information is stored by programming different states of a memory device. For example, binary devices have two states, often denoted by a logic "1" or a logic "0." In other systems, more than two states may be stored. In order to access the stored information, a component of the memory device may read, or sense, the stored state. In order to store the information, a component of the memory device may write, or program, the logic state.

Improving memory devices may include increasing memory cell density, increasing read/write speed, increasing reliability, increasing data retention, reducing manufacturing costs, scaling smaller than traditional devices, as well as reducing power consumption.

Memory cells have varying physical and electrical characteristics during their life cycle due to various factors such as number of accesses, quality of the manufacturing process, environmental factors, and the like. Error Correction Code (ECC) is usually calibrated on a defined status of the cells of the memory device (e.g., end-of-life reliability of the cells), and therefore is generally used at its highest correction power over the entire life of the array. Consequently, there is often an excessive power consumption. It is thus desirable to improve power consumption of memory devices provided with ECC circuitry.

DETAILED DESCRIPTION

With reference to those drawings, devices and methods for an improved operation of memory cells and for reducing ECC power consumption will be disclosed herein.

In the following detailed description, numerous specific details are set forth to provide a thorough understanding of claimed subject matter. However, it will be understood by those skilled in the art that claimed subject matter may be practiced without these specific details. In other instances, methods, apparatuses and/or systems that would be known by one of ordinary skill have not been described in detail so as not to obscure claimed subject matter.

Nonvolatile memories retain their contents when power is switched off, making them good choices for storing information that is to be retrieved after a system power-cycle. A Flash memory is a type of nonvolatile memory that retains stored data and is characterized by a very fast access time. Moreover, it can be erased in blocks instead of one byte at a time. Each erasable block of memory comprises a plurality of nonvolatile memory cells arranged in a matrix of rows and columns. Each cell is coupled to an access line and/or a data line. The cells are programmed and erased by manipulating the voltages on the access and data lines. Access circuitry can differentiate between different logic states of a memory cell. For example, in case of a memory read, the access circuitry applies a voltage pulse with a particular magnitude and polarity to access lines, which results in an electrical response that dedicated sense circuitry can detect. Detecting electrical responses can include, for example, detecting one or more of a voltage drop (e.g., a threshold voltage) across terminals of a given memory cell of the array, current through the given memory cell, and a threshold event of the given memory cell.

In the present disclosure, the term "coupled" can refer to elements that are physically, electrically, and/or communicatively connected either directly or indirectly, and may be used interchangeably with the term "connected" herein. Physical coupling can include direct contact. Electrical coupling includes an interface or interconnection that allows electrical flow and/or signaling between components. Communicative coupling includes connections, including wired and wireless connections, that enable components to exchange data.

Figure 1:
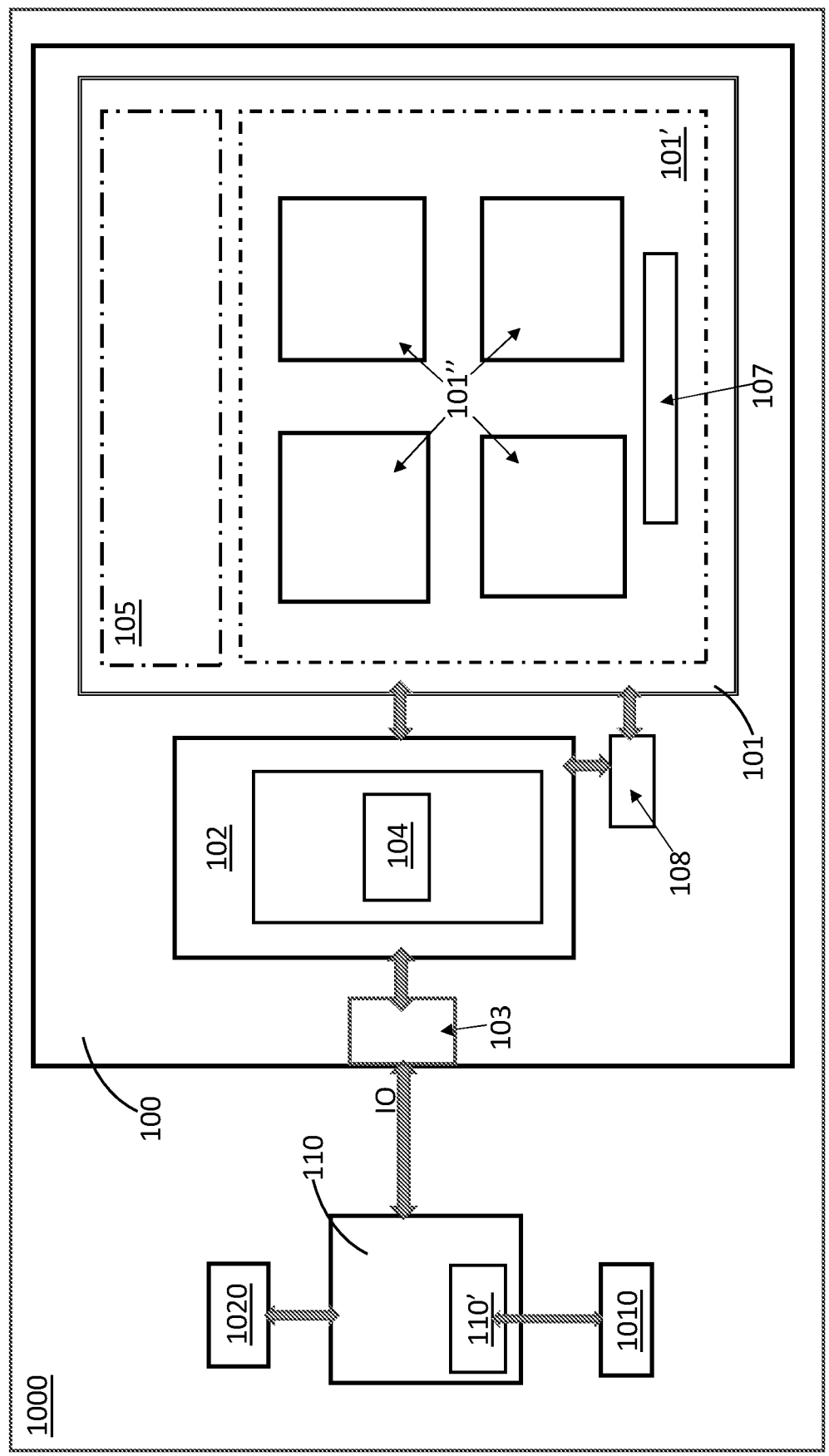
FIG. 1 is a schematic block diagram of a system comprising a memory device that may be operated according to the present disclosure.

FIG. 1 is a schematic high-level block diagram of a system 1000 comprising a memory device 100 according to an exemplary embodiment of the present disclosure, this memory device 100 being arranged, programmed, and configured to perform Error Correction Code (ECC) techniques as disclosed below and having dedicated ECC circuit portions.

The memory device 100 can be a solid-state drive (SSD), for instance, and can include a memory section 101, a controller 102, and a host interface 103. The memory section 101 is not limited to a particular architecture and can include different types of memories.

The controller 102 may be coupled to the host interface 103 and to the memory section 101 via a plurality of channels and can be used to transfer data between the memory section 101 and a host 110. The host interface 103 can be in the form of a standardized interface. For example, when the memory device 100 is used for data storage in a computing system, the host interface 103 can be a serial advanced technology attachment (SATA), peripheral component interconnect express (PCIe), or a universal serial bus (USB), among other connectors and interfaces. In general, the host interface 103 can provide an interface for passing control, address, data, and other signals between the memory device 100 and the host 110.

The controller 102 can include an embedded firmware and is adapted to internally manage and control the operation of the memory section 101. The controller 102 can communicate with the memory section 101 to control data read, write, and erase operations, among other operations. For example, the controller 102 can include a number of components in the form of hardware and/or firmware (e.g., one or more integrated circuits) and/or software for controlling access to the memory section 101 and/or for facilitating data transfer between the host 110 and said memory section 101.

The memory controller 102 thus represents control logic of the device, for example acting in response to command by the host 110 (which may generally be an external managing system of the non-volatile memory). In some embodiments, the memory controller 102 can also be implemented in the host 110, in particular as part of a host processor 110', even if the present disclosure is not limited by a particular architecture.

As disclosed in relation to FIG. 1, the memory controller 102 may receive user data through input/output IO. Multiple signal lines couple the memory controller 102 with the memory section 101. For example, such signal lines may include clock, command/address and write data (DQ), read DQ, and zero or more other signal lines. The memory controller 102 may thus be operatively coupled to the memory section 101 via suitable buses.

The memory device 100 can also comprise other components (not shown) such as processor units coupled to the controller 102, antennas, further connection means with the host device 110, and the like. In any case, the present disclosure is not limited by a specific configuration of the memory device 100.

Moreover, the controller 102 can also include its own memory section (not shown) operatively coupled with other units thereof. In any case, the present disclosure is not limited by a particular configuration of the controller 102.

The memory device 100 may be a portable device configured to be coupled to the host device 110. However, in other embodiments not shown in the drawings, the memory device 100 can also be embedded within one or more host devices. The host 110 may be for example a personal computer, a tablet, a smartphone, a server or the like. The host 110 can include a system motherboard and/or backplane and can include a number of memory access devices (e.g., a number of processors).

In some embodiments, the controller 102 includes an ECC unit 104, also referred to as ECC engine, which is structured and configured to operate according to techniques as described in the following.

The ECC unit 104 can include error correction circuits and logics to detect and correct a number of bit errors, according to embodiments of the present disclosure. The ECC unit 104 is not limited to circuitry (e.g., hardware) implementations. For instance, in addition, the ECC unit 104 can be implemented in firmware, and/or software.

The ECC unit 104 can be embodied by discrete components such as an application specific integrated circuit (ASIC) or by components that reflect functionally provided by circuitry within the controller 102 that does not necessarily have a discrete physical form separate from other portions of the controller 102. Although illustrated as components within the controller 102, the ECC unit 104 can be external to the controller 102 or can have a number of components located within the controller 102 and a number of components located external to the controller 102, wherein the present disclosure is not limited by a specific hardware architecture. The ECC unit 104 can include separate encoding and decoding components, in a number of embodiments. In general, the memory device 100 thus comprises an operating unit (or operating circuit), indicated as 104, which is an ECC engine (which in turn may be coupled to or integrated into the controller 102, which may thus perform the functions of said ECC engine).

In other words, the error detection/correction circuitry of the ECC unit 104, which may be programmed as disclosed below, can include hardware logic to implement an ECC to detect errors occurring in data read from memory section 101. In one embodiment, error detection/correction circuitry also corrects errors (up to a certain error rate based on the implemented ECC code).

The memory section 101 of the memory device 100 can be a flash memory including an array of memory cells, for example a NAND memory, NOR memory, AND memory, and the like. Additionally or alternatively, memory section 101 may comprise bit alterable memory cells; for example, Phase Change Memory (PCM), Ferroelectric Memory (Fe-RAM), Magnetic Memory (MRAM), chalcogenide-based Self Selecting Memory (SSM), etc. Any kind of memory may be employed in embodiments of the present disclosure. For example, the disclosure applies to either or both non-volatile and volatile memories.

In general, the memory section 101 may comprise an array of memory cells 101'. Non-volatile memories may comprise a plurality of blocks, each block being indicated herein with the reference number 101" and comprising a defined number of pages. For the sake of simplicity, only four blocks 101" are shown in the example of FIG. 1.

The memory section 101 represents the memory resource for the memory device 100. In one embodiment, the array of memory cells 101' is managed as rows of data, accessed via wordline (rows) and bitline (columns coupled to individual bits within a row) control. The array of memory cells 101' can be organized as separate channels, ranks, and banks of memory, in general in a plurality of portions, as previously disclosed. Channels are independent control paths to storage locations within memory section. Ranks refer to common locations across multiple memory devices (e.g., same row addresses within different devices). Banks refer to arrays of memory locations within a memory device. In one embodiment, banks of memory are divided into sub-banks with at least a portion of shared circuitry (e.g., drivers, signal lines, control logic) for the sub-banks. It will be understood that channels, ranks, banks, or other organizations of the memory locations, and combinations of the organizations, can overlap physical resources. For example, the same physical memory locations can be accessed over a specific channel as a specific bank, which can also belong to a rank. Thus, the organization of memory resources will be understood in an inclusive, rather than exclusive, manner.

In other words, according to an embodiment of the present disclosure, the array of memory cells 101' may be subdivided into a plurality portions, such as a page, a single block, a group of blocks, or even all blocks (i.e., all the cells), the invention not being limited thereto. The memory cells can thus be grouped, for instance, into a number of blocks including a number of physical pages. A number of blocks can be included in a plane of memory cells and an array can include a number of planes.

Embodiments are not limited to a particular type of memory array or array architecture and the techniques of the present disclosure may be applied to several memory technologies (e.g., planar, cross-point, 3D, etc.).

Memory section 101 may also comprise a further circuit 105 operatively coupled to the array of memory cells 101'.

In one embodiment, the further circuit 105 includes access circuitry and sense circuitry to detect electrical responses of the one or more memory cells to an applied read voltage. In one embodiment, the sense circuitry includes sense amplifiers. FIG. 1 illustrates the further circuit 105 as being embedded in the memory section 101; however, other embodiments can include access circuitry and/or sense circuitry that is separate from the memory section 101. For example, access circuitry and sense circuitry can be included in a memory controller such as the memory controller 102.

Furthermore, the memory device 100, in particular the array of memory cells 101' of the memory section 101, may comprise a non-volatile region 107 apt to store operating information, for example for the management of the memory array according to embodiments disclosed in the following.

In one embodiment, the memory device 100 may also comprise a sensing unit 108 comprising one or more sensors operatively coupled to the memory section 101 and optionally to the controller 102. The sensing unit 108 may be configured to detect a status (e.g., the temperature) of the array of memory cells 101' or of a portion thereof.

Generally, the particular architecture of the memory device 100 may vary according to the needs and/or circumstances without limiting the scope of the present disclosure.

The host 110 and the memory device 100 may form the system 1000. As mentioned before, the host device 110 is a computing device in accordance with any embodiment described herein, and can be a laptop computer, a desktop computer, a server, a gaming or entertainment control system, a scanner, copier, printer, routing or switching device, embedded computing device, or other electronic device such as a smartphone. The host 110 may generally be a system managing the memory section 101, which may be embedded in said system or generally managed by said system. The memory device 100 may thus be managed by an external controller, i.e., the controller embedded in the processor 110' of the host 110, as previously disclosed, so that the ECC unit may also be included in said external controller. In this case, the controller of the memory device may not be present and the memory device 100 (which may be embedded in the host 110) communicates the required information to the external controller.

In one embodiment, the system 1000 includes an interface 1010 coupled to the processor 110', which can represent a higher speed interface or a high throughput interface for system components that needs higher bandwidth connections, and/or graphics interface components. Graphics interface interfaces to graphics components for providing a visual display to a user of system 1000. In one embodiment, graphics interface generates a display based on data stored in the memory device or based on operations executed by processor or both.

The system 1000 may also comprise network interface 1020 communicatively coupled to the host or to memory device for example for connecting with other systems, and/or a battery coupled to provide power to said system.

According to the present disclosure, the ECC unit 104 may be configured to perform an ECC operation (detection and/or correction of errors) with a certain error correction power on a codeword stored in the memory section 101, wherein the codeword includes a certain number of parity bits, as it will be disclosed in the following.

In some embodiments, the actual used ECC correction may vary depending on the number of errors; in other words, in some cases, only a fraction of the full error capability actually available may be exploited, for example when a number of errors detected is smaller than the maximum correctable number of errors. In some embodiments, the ECC correction power may be dynamically modified, for example based on the status of the memory cells of the array.

Figure 2:
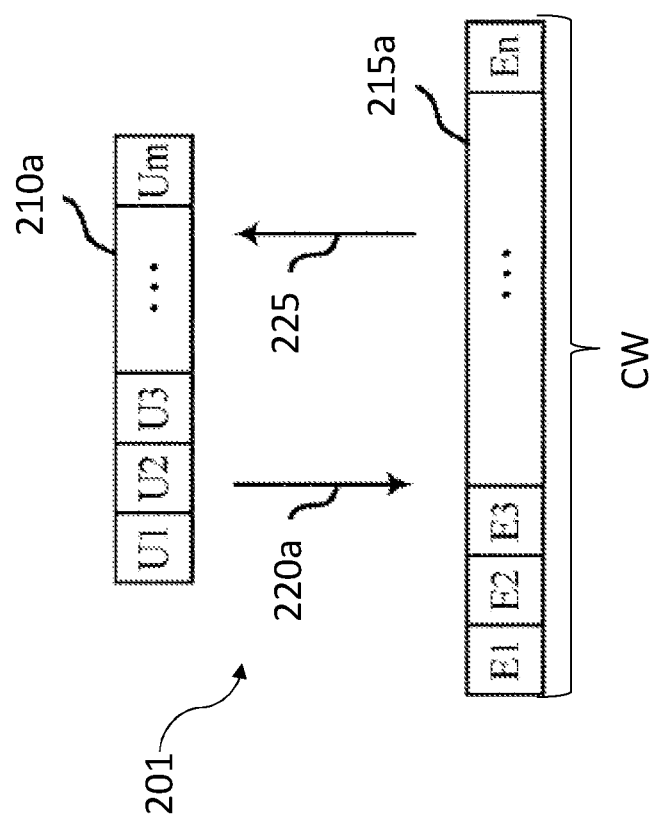
FIG. 2 is an example of user data pattern encoded according to embodiments of the present disclosure.

FIG. 2 illustrates an exemplary user data pattern diagram 201. The user data pattern diagram 201 includes user data 210a and encoded user data 215a. Encoding process 220a, which is performed in the programming phase of the array of memory cells, may convert the user data 210a (U1, . . . , Um) into the encoded user data 215a (E1, . . . , En). The encoded user data 215a may be stored in a set of memory cells, which may be, for example, memory cells of the memory section 101 of FIG. 1. Each box of the encoded user data 215a may correspond to a memory cell that may exhibit a logic state of 1 or a logic state of 0. In embodiments of the present disclosure, during the encoding process 220a, a number of parity bits may be added to the user data (or payload) 210a. A number of bits in the encoded user data 215a may be greater than the number of bits in the user data 210a (e.g., n is larger than m if some bits, e.g., parity bits, are added). Process 225 may convert the encoded user data 215a back to the user data 210a after the encoded user data 215a have been accurately read.

In an embodiment, the plurality of encoded bits to be read represents a codeword (CW). The codeword may be programmed to include various information to be used during the reading phase. In order to keep a smooth and simple description, in the following reference will be made to ECC-related information only.

As mentioned before, when digital data are stored in a memory (such as in the array of memory cells 101' of FIG. 1), data are encoded in such a way that a decoder can identify and correct errors, i.e., data strings are encoded by adding a number of parity bits, and, when the original data is to be reconstructed, the decoder examines the encoded message to check for any errors. In certain embodiments, a block of user data bits is encoded to become a block of n bits (i.e., the codeword CW), as shown in FIG. 2. However, various encoding schemes are possible.

Generally, on the basis of the encoding scheme, a codeword is generated (e.g., as in process 220a) by manipulating the user data bits and adding a number of parity bits. In some embodiments of the present disclosure, the number of added parity bits is a fixed number which corresponds to a defined maximum ECC correction power. Based on the decoding scheme, an ECC syndrome is then produced from the encoded set of user data and parity data, for instance by means of the ECC unit 104 of FIG. 1. The ECC syndrome changes depending on the presence and location of errors. When errors are detected, the ECC unit 104 is able to correct said errors up to and according to the implemented correction power. In some cases, the presence of an uncorrectable error (e.g., in excess of the maximum correction power and the location of which is unknown) may be reported. At read back, the codeword is accessed and decoded according to an ECC scheme.

It is to be noted that the power consumption of an ECC circuitry depends on its correction power. For Example, ECC3 circuitry may require more power than ECC2 circuitry or ECC1 circuitry in the same conditions (wherein ECC3 may be an error correction code with correction power of 3 bits, ECC2 may be an error correction code with correction power of 2 bits, and ECC1 may an error correction code with correction power of 1 bit, in some examples). In any case, for any given ECC correction power, less power may be consumed when less (or no) errors need to be corrected with respect to the power that may be consumed when more errors need to be corrected.

In order to reduce power consumption, according to the present disclosure, an ECC engine is structured and configured in such a way that the ECC syndrome (and thus the corresponding syndrome generation circuit) is split into portions which are controlled independently from each other. In this way, one syndrome portion is calculated at a first step (and thus a corresponding syndrome circuit portion is activated), while other syndrome portions may be calculated only in a second step depending on the first calculated syndrome portion. This allows reducing power consumption of an ECC operation by activating a subset of the ECC circuitry only on an on-need basis.

In some cases, the first calculated syndrome portion and/or the first and second calculated syndrome portions may be indicative of no error being present; under such circumstances, it may not be necessary to compute the second and/or a third syndrome portion, therefore saving power, and data may be output. If, on the contrary, the first calculated syndrome portion and/or the first and second calculated syndrome portions are indicative of one or more errors being present, additional syndrome portions may be calculated to obtain the full syndrome.

Once the ECC syndrome has been calculated, the ECC circuit is then able to calculate the number of errors in a codeword and to adapt on the fly (e.g., based on the error number calculation) its correction power to the number of detected errors. For example, a lower ECC correction may be selected when the number of errors is low, and a higher ECC correction may be selected when the number of errors is higher.

Figure 3:
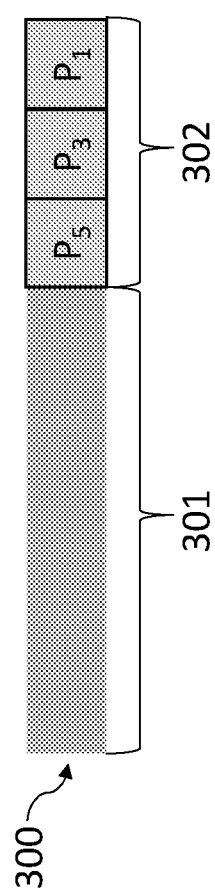
FIG. 3 shows an example of a codeword subjected to techniques according to the present disclosure.

FIG. 3 shows an example of a codeword 300 comprising a first codeword portion 301 corresponding to the payload (thus including encoded user data), and a second codeword portion 302 corresponding to the parity data. It is noted that such a distinction may be somehow arbitrary; as a matter of fact, an encoding process (such as process 220a in FIG. 2) may combine and mix the user data and the parity data so that the codeword as a whole should be considered.

In this example, the parity data include parity bits stored in parity cells denoted as $P_1$, $P_3$ and $P_5$. In other words, in the example of FIG. 3, a number of bits to calculate syndrome $S_1$ (corresponding to ECC1), syndrome $S_3$ (corresponding, together with $S_1$, to ECC2) and syndrome $S_5$ (corresponding, together with $S_1$ and $S_3$, to ECC3) is stored. It is observed that a single block of the codeword portion 302 does not necessary correspond to a single cell and may also corresponds to a group of cells, e.g., it generally represents the number of bits to calculate the syndrome for a corresponding ECC correction power. Moreover, it should be understood that, while three levels of protection are depicted in FIG. 3 (e.g., ECC1, ECC2 and ECC3), any number may be conceived. For example, embodiments with higher (e.g., N>3) error correction capabilities are possible.

Therefore, according to the present disclosure, user data are stored in a plurality of memory cells of the memory array, as well as parity data associated with the user data are stored in a number of parity cells. The number of stored parity bits is predetermined and not varied in operation, in some embodiments.

More specifically, the present disclosure provides calculating a first syndrome portion from the stored user data and parity data and then checking if said first syndrome portion is equal to zero. Then, based on the calculation of the first syndrome portion, other syndrome portions may be calculated, in particular if the said syndrome portion is different from zero, indicating the presence of errors.

Figure 4:
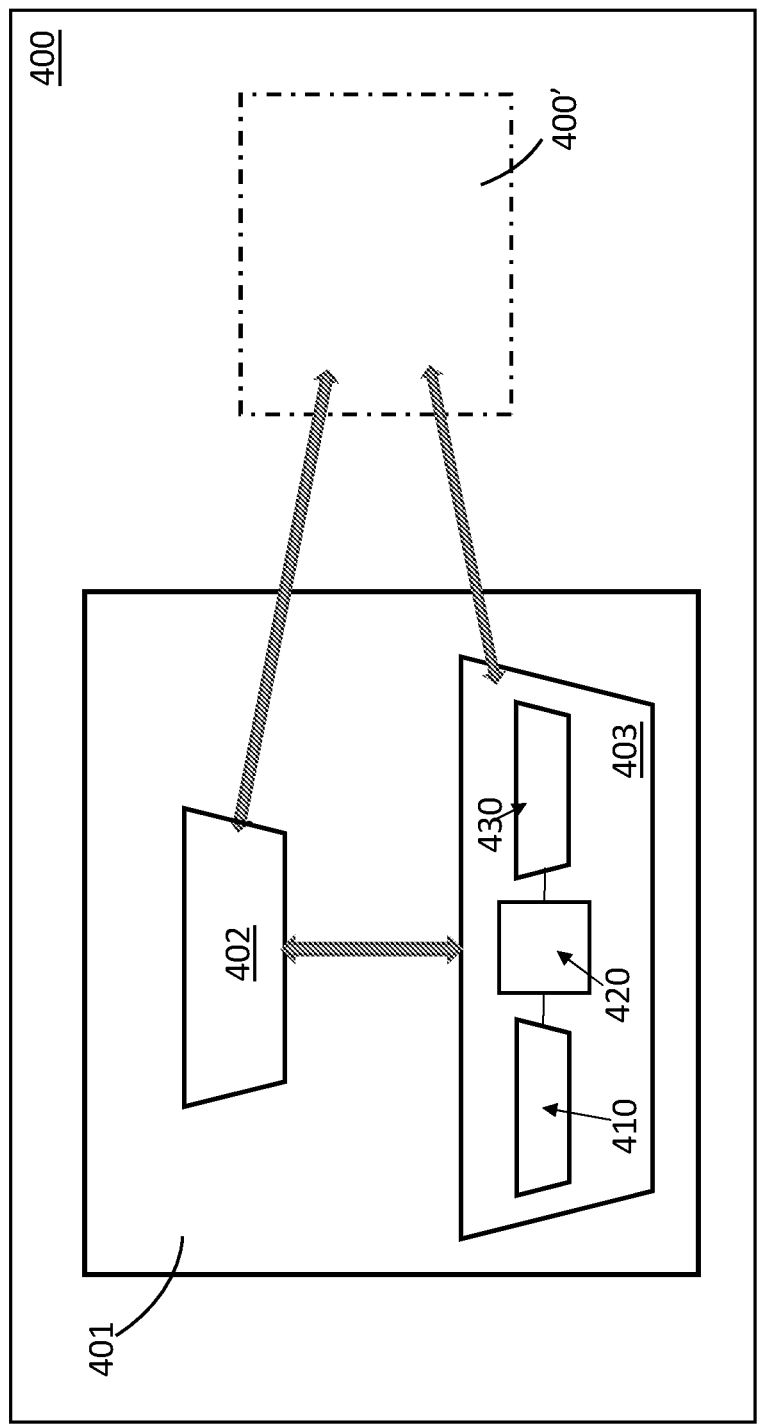
FIG. 4 is a schematic block diagram of an operating circuit for managing Error Correction Code (ECC) operation in a memory device according to embodiments of the present disclosure.

FIG. 4 is a schematic block diagram of an operating circuit 401 for managing ECC operation in a memory device 400 (which may correspond to memory device 100 of FIG. 1) according to an embodiment of the present disclosure. As shown in FIG. 4, the memory device 400 comprises an operating circuit 401 for managing the operation of an array of memory cells 400' (which may correspond to array 101' of FIG. 1). The operating circuit 401 may be part of a controller of the device, such as controller 102 of FIG. 1, or may be external to the controller, or can have a number of components located within the controller and a number of components located external to the controller, wherein the present disclosure is not limited by a specific hardware architecture.

The operating circuit 401 (which may correspond to ECC unit 104 of FIG. 1, in some examples) can include error correction circuitry and logics to detect and correct a number of bit errors (up to a maximum number of errors based on the implemented ECC code), according to embodiments of the present disclosure. The operating circuit 401 can be embodied by discrete components such as an application specific integrated circuit or by components that reflect functionally provided by circuitry within the controller that does not necessarily have a discrete physical form separate from other portions of the controller. Therefore, in the present disclosure, the term "operating circuit" is used in a general and nonlimiting way.

The operating circuit 401 can include separate encoding and decoding components, in a number of embodiments. More in particular, as shown in FIG. 4, the operating circuit 401 comprises an encoding unit 402 configured to generate a codeword according to encoding schemes. The codeword may comprise payload data stored in a plurality of memory cells and parity data associated with the payload data stored in parity cells, as shown with reference to the codeword 300 of FIG. 3.

The operating circuit 401 further comprises a decoding unit 403 configured to perform an ECC operation (such as bit error detection and/or correction) on the stored codeword. Therefore, the operating circuit 401 is able to generate a codeword comprising payload data and parity data via the encoding unit 402 and to process said codeword via the decoding unit 403. The encoding unit 402 and the decoding unit 403 may be operatively connected to each other and to the array 400'.

The decoding unit 403 may comprise a syndrome generating unit 410 configured to generate an ECC syndrome from the user data and parity data stored in the input codeword. Moreover, the decoding unit 403 may comprise an error unit 420 which is activated when errors are detected and is configured to account for the number of errors contained in the codeword. The decoding unit 403 may further comprise a syndrome decoding unit 430 configured to process the syndrome and to perform a corresponding ECC operation on the stored data.

According to the present disclosure, the syndrome generating unit 410 comprises a plurality of circuits which, alone or grouped, may form circuit portions, each circuit portion being configured to calculate a respective syndrome portion. Each syndrome portion may be used for implementing an ECC correction power; for example syndrome portion $S_1$ may be used to implement ECC1, while syndrome portion $S_3$ may be used, together with $S_1$, to implement ECC2. Each circuit portion is selectively activable by the operating circuit 401 according to the results of the calculation of a first syndrome portion. As already observed for the term "operating circuit", in the present disclosure also the term "circuit portion" is used in a general and nonlimiting way and may be embodied in several ways. Each syndrome portion (or combination of portions) may be indicative of no error being present in the codeword, so that no correction is needed, or that some error is present and additional syndrome portions should be calculated for the proper determination of the number of errors and their correction.

In one embodiment of the present disclosure, the circuit portions of the syndrome generating unit may comprise one or more exclusive OR (XOR) circuits, for example arranged in a matrix of rows and columns. In some embodiments, a syndrome bit is the XOR of many bits of the codeword that was read from the memory cells. Different syndrome bits may have some codewords bits in common, so that they may share a part of those XOR gates. The association between syndrome bit and codeword bits may be represented by binary matrices (e.g., a "1" in the matrix indicates that the corresponding codeword bits is contributing to the syndrome bit, while a "0" in the matrix indicates that the corresponding bits doesn't contribute to this syndrome bit).

The circuit portions may be activable alone or in groups, in some examples. In an embodiment of the present disclosure, the operating circuit is configured to selectively disable circuit portions relating to syndrome portions that are not to be calculated.

Based on this general architecture, the present disclosure provides techniques to optimize the ECC operation in order to reduce power consumption. More specifically, according to the present disclosure, the operating unit is configured to activate a first circuit portion of the syndrome generating unit for calculating a first syndrome portion, and, based on the calculated first syndrome portion, decide whether to activate or not to activate at least one second circuit portion for the calculation of a second syndrome portion. For example, the operating unit may be configured to activate the second circuit portion if the first syndrome portion has a least one value different from zero.

Figure 5:
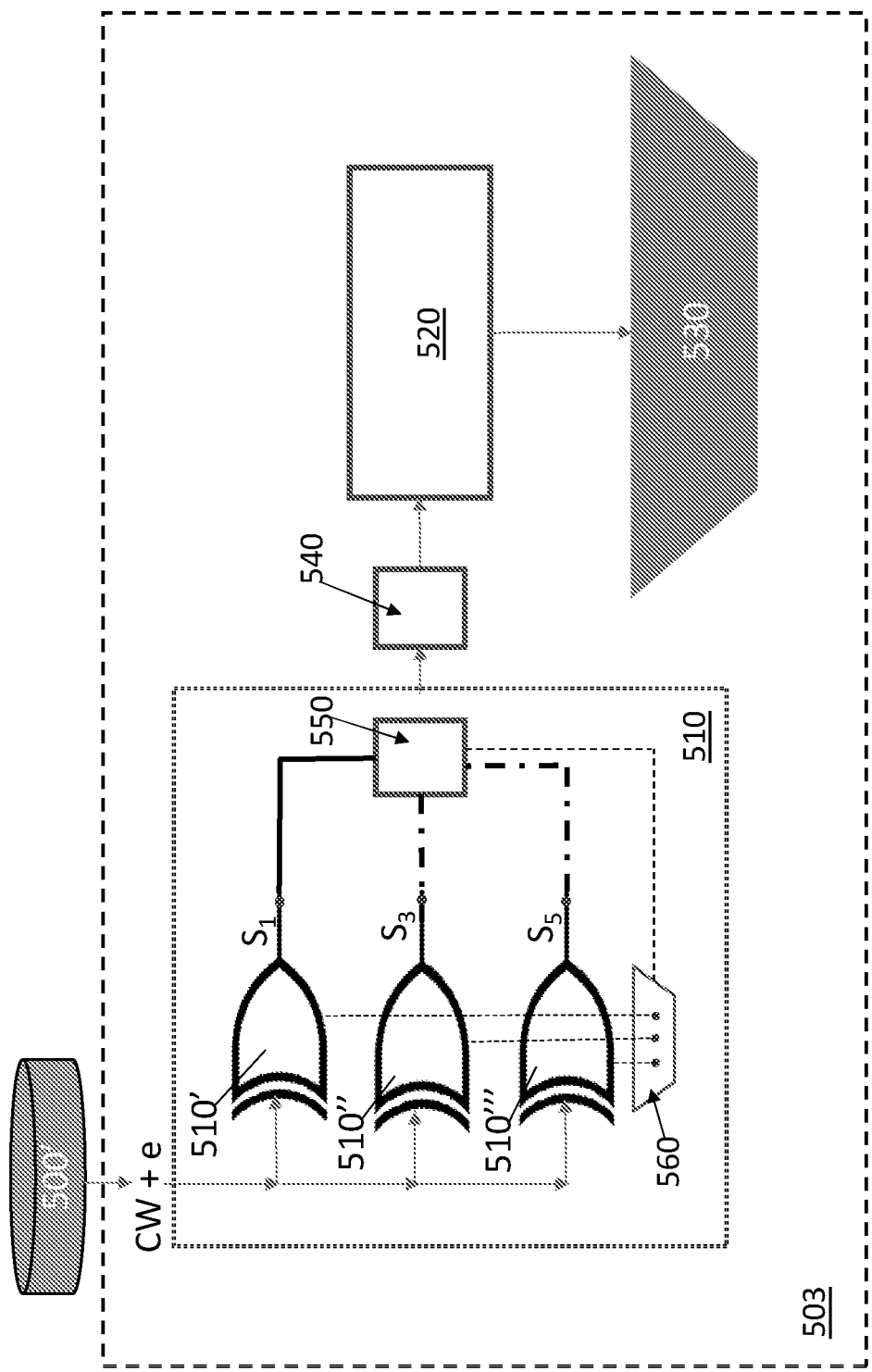
FIG. 5 shows exemplary details of an operating circuit comprising selectable circuit portions for calculating an ECC syndrome according to embodiments of the present disclosure.

Referring now to the example of FIG. 5, a codeword CW is generated and stored in an array 500' (which may correspond to array 400' of FIG. 4). When the codeword CW is stored in the array 500', an error may occur, this error being denoted as "e" in FIG. 5. The codeword CW is then fed as an input to decoding unit 503 (which may correspond to decoding unit 403 of FIG. 4). More in particular, in the decoding unit 503, an ECC syndrome may be generated by a syndrome generating unit 510 (which may correspond to syndrome generating unit 410 of FIG. 4), as it will be detailed below. Then, if one or more error/s is/are detected, the error number is calculated by an error unit 520 (which may correspond to the error unit 420 of FIG. 4). The error unit 520 is therefore configured to determine the number of errors in the data based on the calculated syndrome. In an embodiment, the error unit 520 is activated by a first logic unit 540 which is configured to enable said error unit 520 in case errors are detected (e.g., when at least one value of the ECC syndrome is different from zero). A syndrome decoding unit 530 (which may correspond to the syndrome decoding unit 430 of FIG. 4) is then apt to receive the calculated syndrome and to execute an ECC operation, so that a corrected codeword is output.

According to embodiments of the present disclosure, the syndrome generating unit 510 may comprise a plurality of circuits for calculating corresponding parts of the ECC syndrome from the input data of the codeword. For example, in some embodiments, the syndrome generating unit 510 may comprise a circuit for calculating $S_1$, denoted as 510', a circuit for calculating $S_3$, denoted as 510", and a circuit for calculating $S_5$, denoted as 510'". Clearly, it is to be understood that even if only $S_1$, $S_3$, and $S_5$, relating to three levels of ECC protection (i.e., ECC1, ECC2, and ECC3) are shown in FIG. 5, any number may be conceived, and the present disclosure is not limited by the shown examples. The circuits 510', 510" and 510'" may be activated when needed and they may form, alone or combined with each other, the circuit portions of the present disclosure.

Therefore, ECC blocks specialized for calculating a required syndrome portion may be selectively enabled by the operating circuit based on the results of a previous calculation. In this way, it is possible to perform an on-need calculation of a second syndrome portion (e.g., $S_3$) based on the result of a first syndrome portion calculation (e.g., $S_1$).

It is to be observed that many configurations are possible; for example, as it will be detailed in the following, in some configurations, it is possible to calculate $S_3$ as the second syndrome portion based on the previous calculation of $S_1$, and, in other configurations, it is possible to calculate $S_5$ as the second syndrome portion based on the previous calculation of $S_1$ and $S_3$, and so on, each configuration depending on smallest information required for the first calculation, which in turn depends on the level of ECC protection.

If a first circuit portion is activated at a first step (e.g., in case of an ECC2, only circuit 510' for calculating $S_1$), and the calculated syndrome portion is equal to zero (which is indicative of no error being present in the codeword), then no second circuit portion is activated and also the error unit 520 is not activated. On the other hand, if the calculated first syndrome portion is not equal to All0 (which is indicative of at least one error being present in the codeword), a second circuit portion (e.g., in case of an ECC2, circuit 510" for calculating $S_3$) is activated after the first circuit portion, and the error unit 520 is configured to the determine the number of errors based on a combination of all the calculated syndrome portions (e.g., for an ECC2, based on $S_1$ and $S_3$). In general, according to embodiments of the present disclosure, the operating circuit is configured to enable the error unit 520 if the calculated syndrome exhibits at least one value different from zero.

Still referring to the example of FIG. 5, the operating circuit, in particular the decoding unit 503, comprises a second logic unit 550 configured to evaluate the first syndrome portion values and to detect if said calculated first syndrome portion is All0 or comprises at least one value different from zero. In some embodiments, the second logic unit 550 may be part of the first unit 540, or it may be embodied by separate circuitry, wherein the present disclosure is not limited by a specific hardware architecture. Generally, the operating unit thus comprises means for evaluating the values of the calculated syndrome portions and for selectively enabling one or more circuit portions based on the calculation of said first syndrome portion.

In some embodiments, the decoding unit 503 further comprises a selector element 560 coupled to circuits 510' (activable for calculating $S_1$), 510" (activable for calculating $S_3$) and 510"' (activable for calculating $S_5$). Selector 560 may be configured to initially select circuit portion 510' for calculation of first syndrome portion $S_1$, for example. Based on the calculation of the first syndrome portion and therefore based on the output of the second logic unit 550, the selector element 560 is configured to selectively enable one second circuit portion to calculate the respective second syndrome portion. The selector element 560 may be a multiplexer, in some examples. In some embodiments, the selector element may be integrated into the first and/or second logic units.

For example, in case of an ECC2, circuit 510' may be initially or always active and syndrome $S_1$ (which in this case is the first syndrome portion) is processed by the second logic unit 550 and, if $S_1 \neq 0$, the selector element 560, which is connected to the second logic unit 550, activates circuit 510" for the calculation of $S_3$ (which in this case is the second syndrome portion). Likewise, in case of an ECC3, circuit 510' and circuit 510" (which together form the first circuit portion) may be initially or always active and syndromes $S_1$ and $S_3$ (forming together the first syndrome portion) are processed by the second logic unit 550 and, if $S_1 \neq 0$ and/or $S_1 \neq 0$, the selector element 560, which is connected to the second logic unit 550, also activates circuit 510"' (which in this case is the second circuit portion) for the calculation of $S_5$ (which in this case is the second syndrome portion).

It is observed that expressions "first syndrome portion", "first circuit portion", "second circuit portion", "second syndrome portion", and the like, do not necessarily refer to single circuits or syndrome pieces, but may correspond to a combination of several circuits and syndrome pieces. For example, in case of ECC3, the first syndrome portion may correspond to the combination of $S_1$ and $S_3$, as well as the first circuit portion may correspond to circuits 510' and 510" of FIG. 5. In general, the syndrome generating unit 510 comprises a plurality of circuits (for example, circuits 510', 510", and 510"' of FIG. 5) which may be logically grouped to form the circuit portions of the present disclosure.

It is also to be observed that the disclosed implementations of FIG. 5 can be modified without departing from the scope of the present disclosure. The illustrated configuration is only one of many possible configurations and the present disclosure is not limited by the exemplary embodiments shown in the drawings.

If the calculated syndrome of the codeword is zero, there are no errors in the corresponding codeword, which is transmitted as output without further processing.

Furthermore, in some embodiments, the ECC correction power to be applied by the syndrome decoding unit 530 is based on the determined number of errors as calculated by the error unit 520. For example, the syndrome decoding unit 530 may comprise a plurality of syndrome decoder circuit portions (not shown in the drawings), each syndrome decoder circuit portion being configured to perform a specific ECC operation on the stored data and being selectively activable by the operating circuit, which is configured to selectively activate one or more syndrome decoder circuit portions based on the determined number of errors. In this way, only the syndrome decoder circuit portions that are strictly necessary to correct the actual number of errors as determined may be enabled while syndrome decoder circuit portions that are not needed may be disabled. In other words, circuit portions for correction of a number of errors different from the actually determined number of errors (e.g., a higher ECC correction power) may be disabled, so as to further reduce power consumption.

According to an embodiment of the present disclosure, the first syndrome portion to be calculated is the lowest selectable according to a defined target ECC. In general, the operating unit is configured to select the first syndrome portion to be calculated based on the target ECC, wherein the target ECC (or ECC scope, or implemented ECC) may be defined at design level. For example, according to some technologies, an ECC2 correction engine may be implemented. In different situations (e.g., more requiring applications, different cost/performance specifications, etc.) an ECC3 engine (or higher correction power) may be implemented. Based on this design choice, the corresponding first syndrome portion calculation is determined (e.g., $S_1$, or $S_1+S_3$, and so on).

In other words, according to embodiments of the present disclosure, a target ECC is firstly selected, and then the first syndrome portion to be calculated is selected based on said target ECC. As mentioned before, the target ECC can be chosen at design level (e.g., it may be one of ECC2, ECC3, ECC4, etc., for example) or, in different embodiments, it may be dynamically selected during the device operation, for example based on the status of the memory cells of the array.

It is observed that, since syndrome $S_1$ is equivalent to an ECC1 code, and, in some embodiments, ECC1 codes have a Hamming distance of three, then said syndrome $S_1$ can be All0 if zero errors are present or in some cases of three or more errors, but not with one or two errors. Likewise, the combination of $S_1$ and $S_3$ is equivalent to an ECC2 code, which, in some embodiments, has a Hamming distance of five. As a consequence, the combination of syndromes $S_1$ and $S_3$ can be All0 in the zero-error case or in some cases of five or more errors, but not with one, two, three or four errors. In general, depending on the target ECC (e.g., ECC1, ECC2, ECC3, . . . ), by checking when the calculated syndrome portion is All0, the zero-error case can be distinguished from the case in which the ECC corrector is required. Said it differently, for any target ECC, a corresponding first syndrome portion calculation may be identified, that allows to speed-up the entire read operation by skipping any additional syndrome portion calculation under the circumstances that no error is detected (that is the most likely situation); this also allows a considerable energy saving. If one or more errors are detected, additional syndrome portions are calculated and only the circuits needed to correct the determined number of errors are activated, resulting in a limitation of energy consumption.

Figure 6:
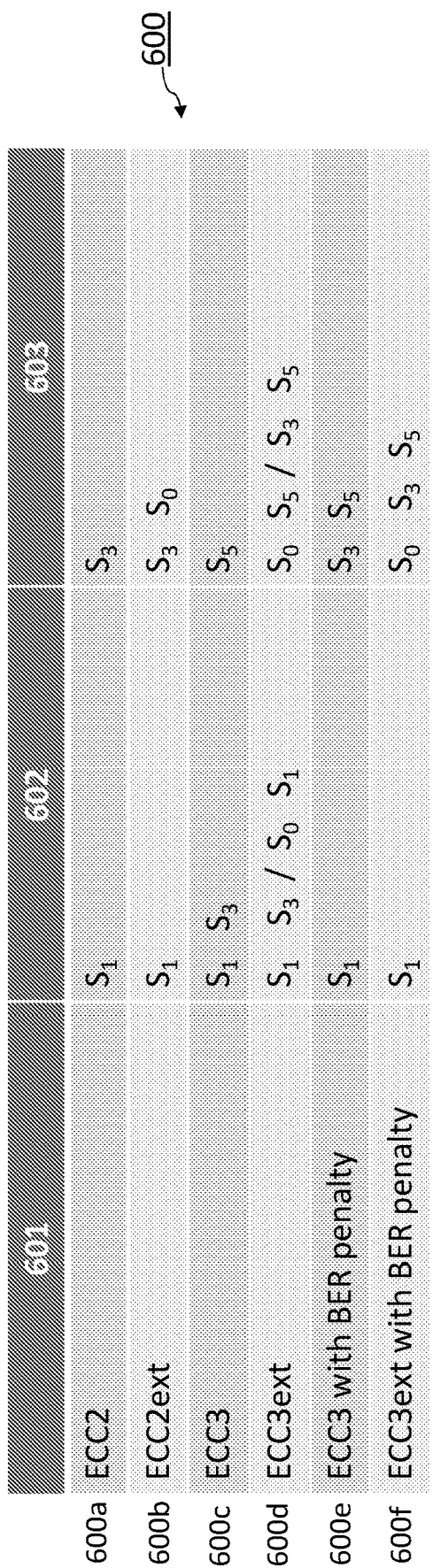
FIG. 6 is a table showing examples of syndrome portion calculation according to embodiments of the present disclosure.

FIG. 6 is a table 600 listing examples of calculations of syndrome portions according to embodiments of the present disclosure. In this table, first column 601 lists the target ECC, i.e. the desired ECC protection, second column 602 lists the first syndrome portion to be calculated according to the target ECC, and third column 603 lists the second syndrome portion to be calculated after the first syndrome portion.

For example, in case of ECC2 (line 600a of table 600), it enough to calculate $S_1$ as the first syndrome portion and then, if needed, to enable the calculation of $S_3$ as the second syndrome portion. More in particular, if $S_{1=0}$, i.e., when zero errors are present, there is no need to calculate $S_3$ and thus to activate the related circuit portion. In case of one or two errors, $S_1 \neq 0$ and the circuit portion for the calculation of $S_3$ is activated, while the case of three or more errors is not relevant when the target ECC is ECC2 (i.e., this latter case is out of ECC2 scope).

In another example, in case of an Extended ECC2 (line 600b of FIG. 6), i.e., in case of an ECC2 code characterized by an additional syndrome bit (herein denoted as $S_0$), the first syndrome portion to be calculated is $S_1$ and, when $S_1$ is different from zero, the additional syndrome bit $S_0$ is calculated aside $S_3$ as the second syndrome portion.

For higher ECC correction powers (e.g., ECC3, ECC4, ECC5, etc.), the calculation of $S_1$ as the first syndrome portion may not be enough, so that other calculations (and therefore the activation of other XOR circuits) may be required at the first step, while higher grade syndrome portions may be calculated in the second step.

In the case of ECC3 (line 600c of table 600), it is not enough to check for $S_1$, so that both $S_1$ and $S_3$ are calculated as the first syndrome portion in order to decide whether to enable the calculation of the second syndrome portion ($S_5$ in this example). More in particular, in this example, if $S_1=0$ and $S_3=0$, then there is no need to calculate $S_5$ and to activate the related circuit potion. If, on the contrary, the first syndrome portion calculation ($S_1$ and $S_3$) is indicative of one or more errors, then $S_5$ is also calculated, the actual number of errors is determined, and they are corrected by activating the (and only the) syndrome decoder circuit portions for the correction.

In another example, in the case of an extended ECC3 (line 600d of FIG. 6), it is not enough to calculate only $S_1$ as the first syndrome portion, and also the additional bit $S_0$ is calculated at the first step, in such a way that the first syndrome portion is the combination of $S_0$ and $S_1$. Based on the calculation of this first syndrome portion, it is possible to decide whether to enable the calculation of $S_3$ and $S_5$ as the second syndrome portion. In other words, in this example, if $S_0=0$ and $S_1=0$ then $S_3$ and $S_5$ are not calculated and thus the related circuits are not activated. In an alternative embodiment, in the case of an extended ECC3, it is also possible to calculate the first syndrome portion as the combination of $S_1$ and $S_3$ and then, based on this first syndrome portion, to decide if enable the calculation of $S_0$ and $S_5$ as the second syndrome portion. In either of these cases, after second syndrome portion calculation, if needed, the actual number of errors is determined, and they are corrected by activating the needed syndrome decoder circuit portions.

According to another embodiment of the present disclosure, since a codeword in most cases comprises zero or one error and the occurrence probability of a higher number of errors decreases by orders of magnitude, the calculation of the first syndrome portion may involve calculating only part of the syndrome that would be theoretically required for the given target ECC correction power. In this case, since a lower protection is implemented by calculating only part of the minimum necessary syndrome, the occurrence of errors may be slightly higher (i.e., a small Bit-Error-Rate, BER, penalty may occur), but the power consumption is further reduced. In other words, a small BER increase could be accepted in order to achieve a further power reduction.

For example, in this embodiment, in case of a BCH code implementing an ECC3, if only $S_1$ (and not $S_3$) is calculated as the first syndrome portion, there is a probability to believe that there is no error while actually there are three errors, so that 0.2% of the error triplet may not be corrected, leading to a small BER increase. In other words, in this example, if $S_1=0$, there may not be a sole error nor a pair of errors; however, the probability of three errors resulting in $S_1=0$ is 0.2% and $S_3$ and $S_5$ may not be calculated if such an error increase is acceptable. Therefore, a small BER penalty may be accepted in favor of an improved power consumption. It is to be observed that, even if a BCH code is implemented in the above example, others ECC codes may be used, and the present disclosure is not limited to the shown examples.

Referring now to line 600e of table 600, in case of an ECC3 with an accepted BER penalty, the first syndrome portion may comprise only $S_1$ and, based on the calculation of $S_1$, it is possible to decide whether to calculate or not $S_3$ and $S_5$ as the second syndrome portion. Therefore in this embodiment, as for ECC2, $S_3$ and $S_5$ calculation could be controlled and enabled only when $S_1 \neq 0$ also with an ECC3.

Referring now to line 600f of table 600, in case of an extended ECC3 with an accepted BER penalty, the first syndrome portion to be calculated is $S_1$ and the second syndrome portion is given by the combination of $S_0$, $S_3$ and $S_5$, this second syndrome portion being calculated only in case $S_1 \neq 0$.

It is to be observed that the cases listed in table 6 are only nonlimiting examples of application of the techniques disclosed herein, and the present disclosure may be applied to many others protection levels with many other possible ECC configurations.

As mentioned before, when a first syndrome portion is calculated, it could be equal to zero also when errors are present, since each selectable target ECC correction power corresponds to a syndrome different from zero up to a given number of errors. For example, an ECC3 is not intended to give a correct result in case of five errors; however, for an ECC3, this number of errors is out of scope of the selected ECC correction power and therefore this is not a hindrance for the techniques herein disclosed.

Furthermore, a different number of errors may occur for different portions of the array of memory cells. Therefore, according to an embodiment of the present disclosure, the memory cells of the array may be grouped into a plurality of portions, each portion being operated according to a specific target ECC correction power based on a desired protection level. A "portion" of the array is thus a group of memory cells being operated according to the techniques of the present disclosure. According to an embodiment, a memory portion may correspond to an internal subdivision like a bank group, a bank, a section or whatever other suitable internal subdivision of the memory. Moreover, the memory portion may also correspond to a specification/host subdivision like a buffer, a page, i.e., a subdivision at high level. In an embodiment, the whole memory array may be coherent in term of ECC correction power. Moreover, in some embodiments, a page may be operated at a maximum correction power (with only $P_1$ and $P_3$ parity bits being stored) while another page may be operated at an ECC3 maximum correction power (with $P_1$, $P_3$ and $P_5$ parity bits being stored). The maximum ECC correction power may be dynamically modified during operation. For example, a subsequent lower (or higher) maximum ECC correction power may be implemented (e.g., different from an antecedent maximum ECC correction power). A portion may correspond to one of a codeword, a bank, a bank group, a section of the array, the entire array, or even a buffer, a page, and the present disclosure is not limited by the way the cells are grouped. The subdivision of the array into several portions is better suited to real memory devices.

Figure 7:
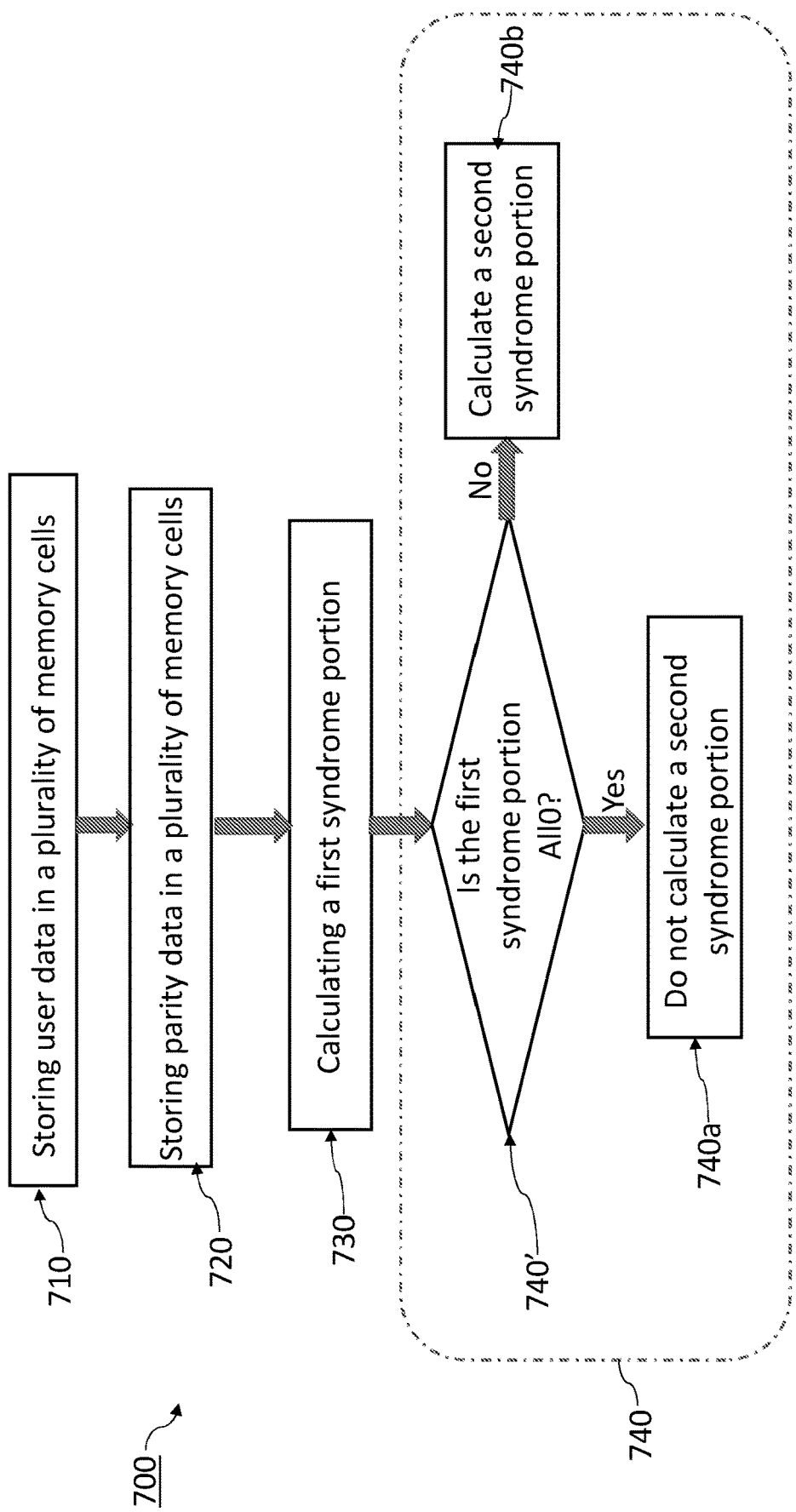
FIG. 7 is a flow diagram of steps of a method according to an embodiment of the present disclosure.

FIG. 7a is flow diagram representing steps of a method 700 for operating an array of memory cells according to the embodiments of the present disclosure. The processes described can be performed by hardware logic and circuitry. For example, the following processes are described as being performed by encoding 402 and/or decoding 403, 503 units as described in FIGS. 4 and 5 and/or access circuitry, sense circuitry and ECC circuitry, as disclosed herein. However, other embodiments can include different circuitry configurations suitable for performing the processes.

The method of the present disclosure is a method for improving the operation of memory cells having ECC protection. Access circuitry writes data to a plurality of memory cells. For example, access circuitry writes logic 0s and logic 1s to a plurality of memory cells such as the memory cells in the memory section 101 of FIG. 1. In one embodiment, access circuitry can write logic 0 by applying programming pulses with a negative polarity and logic 1 by applying programming pulses with a positive polarity. The opposite convention can also be adopted. Different programming pulses may be applied to memory cells, depending on the technology. After writing data to the plurality of memory cells, access circuitry can read the plurality of memory cells and ECC circuitry can verify the presence of errors and correct them.

More in particular, at step 710, user data are stored in a plurality of memory cells of a memory array, e.g., are stored in a codeword. Operations associated with step 710 may be executed by an encoding unit 402, for example.

At step 720, parity data associated with the user data are stored in a determined number of parity cells of the memory array (e.g., in the codeword). Operations associated with step 720 may be executed by the encoding unit 402, for example.

Then, an ECC syndrome is calculated from the stored user data and parity data, wherein the ECC syndrome comprises one or more syndrome portions. In other words, said syndrome portions correspond, alone or combined with each other, to a given ECC protection level. More in particular, at step 730, a first syndrome portion is calculated.

Based on the first syndrome portion calculation, the method comprises a step 740 of deciding whether to calculate or not to calculate at least one second syndrome portion.

For example, in some embodiments, the method comprises a step 740' of checking if the first syndrome portion has a least one value different from zero. If the first syndrome portion is All0, no second syndrome portion is calculated (step 740a), or conversely the second syndrome portion is calculated at step 740b.

In conclusion, the present disclosure provides an on-the-fly optimization of ECC power consumption through on-need syndrome pieces calculation. The techniques of the present disclosure therefore allow a great flexibility in ECC circuitry design. The general idea is to activate only the necessary circuitry relating to the syndrome portions that are to be calculated, while unused ECC circuitry may then be disabled, leading to a reduced power consumption.

According to the present disclosure, the ECC engine is thus adapted to wake up blocks (herein indicated as circuit portions, for example including one or more XOR circuits) for calculating the corresponding syndrome portions (e.g., $S_1$, $S_3$, $S_5$, etc.). Therefore, only the strictly necessary circuitry is enabled in the ECC engine. More specifically, the ECC engine is configured to enable the lowest power consumption circuit portion corresponding to the minimum required syndrome portion to be calculated and to disable the remaining circuits. Generally, the probability to have a higher number of errors in a codeword decreases by orders of magnitude and most codewords are error-free or contain only one error so that, in many cases, the use of the highest correction power available in an ECC circuit results in higher power consumption but does not result in a real benefit in terms of data security/accuracy. According to the techniques herein disclosed, the above problem is avoided by splitting the syndrome generating unit into different pieces which are separately activable. For example, in some embodiments, a first circuit portion generates the lowest order part of the syndrome (e.g., for ECC2, only $S_1$ is calculated at the first step); then depending on $S_1$ value, it is possible to decide whether calculate or not the other syndrome portion (e.g., for ECC2, $S_3$), and depending on the whole syndrome, the number of errors in a codeword can be calculated. The techniques disclosed in the present disclosure allow a significant power reduction, since only a subset of a device circuitry is activated at every computation while other portions are activated only on an on-need basis.

According to an exemplary embodiment, a memory device comprises an array including a plurality of memory cells, and an operating unit comprising an encoding unit configured to store user data in a plurality of memory cells of the memory array and to store parity data associated with the user data in a number of parity cells of the memory array. The operating circuit further comprises a decoding unit comprising a syndrome generating unit configured to calculate an ECC syndrome from the stored user data and parity data, wherein the syndrome generating unit comprises a plurality of circuit portions, each circuit portion being configured to calculate a respective syndrome portion of the ECC syndrome, and wherein the operating unit is configured to activate a first circuit portion of the syndrome generating unit for calculating a first syndrome portion, and, based on the calculated first syndrome portion, decide whether to activate or not to activate a second circuit portion for the calculation of a second syndrome portion.

According to another exemplary embodiment, a memory device comprises an array including a plurality of memory cells and a controller configured to store user data in a plurality of memory cells of the memory array, store parity data associated with the user data in a number of parity cells of the memory array, and calculate an ECC syndrome from the stored user data and parity data. The controller comprises a plurality of circuit portions, each circuit portion being configured to calculate a respective syndrome portion of the ECC syndrome, wherein the controller is further configured to activate a first circuit portion of the syndrome generating unit for calculating a first syndrome portion based on a target ECC correction power, and, if the first syndrome portion has a least one values different from zero, activate at least one second circuit portion for the calculation of a second syndrome portion.

The present disclosure also relates to a method for operating an array of memory cells, the method comprising storing user data in a plurality of memory cells of the memory array, storing parity data associated with the user data in a number of parity cells of the memory array, and calculating an ECC syndrome from the stored user data and parity data, wherein the ECC syndrome comprises one or more syndrome portions wherein calculating the ECC syndrome comprises calculating a first syndrome portion, and, based on the calculated first syndrome portion, deciding whether to calculate or not to calculate at least one second syndrome portion. If not explicitly indicated, method steps are not necessarily in the disclosed sequence.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause-and-effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

The invention claimed is:

1. A memory device comprising:
an array including a plurality of memory cells; and
an operating unit comprising:
an encoding unit configured to:
store user data in a plurality of memory cells of the memory array; and
store parity data associated with the user data in a number of parity cells of the memory array,
a decoding unit comprising a syndrome generating unit configured to calculate an ECC syndrome from the stored user data and parity data,
wherein the syndrome generating unit comprises a plurality of circuit portions, each circuit portion being configured to calculate a respective syndrome portion of the ECC syndrome, and
wherein the operating unit is configured to:
activate a first circuit portion of the syndrome generating unit for calculating a first syndrome portion; and
based on the calculated first syndrome portion, decide whether to activate or not to activate a second circuit portion for the calculation of a second syndrome portion.

2. The memory device of claim 1, wherein the operating unit is configured to activate the second circuit portion if the first syndrome portion has a least one value different from zero.

3. The memory device of claim 1, wherein the operating unit is configured to select the first syndrome portion to be calculated based on a target ECC.

4. The memory device of claim 1, wherein, the first syndrome portion is the one whose calculation requires less power.

5. The memory device of claim 1, comprising means for evaluating the values of the calculated syndrome portion and for selectively enabling one or more circuit portions based on the calculation of the first syndrome portion.

6. The memory device of claim 1, comprising an error unit configured to determine a number of errors in the data based on the calculated syndrome portion.

7. The memory device of claim 6, wherein, if at least one second circuit portion is activated after the first circuit portion, the error unit is configured to the determine the number of errors based on a combination of all the calculated syndrome portions.

8. The memory device of claim 6, wherein the operating circuit is configured to enable the error unit if the calculated syndrome exhibits at least one value different from zero.

9. The memory device of claim 6, wherein the operating unit comprises a syndrome decoding unit configured to receive the calculated syndrome and to implement an ECC operation based on a determined number of errors.

10. The memory device of claim 9, wherein the syndrome decoding unit comprises a plurality of syndrome decoder circuit portions, each circuit portion being configured to perform a specific ECC operation on the stored data and being selectively activable by the operating circuit, said operating unit being configured to selectively activate one or more syndrome decoder circuit portions based on the determined number of errors.

11. The memory device of claim 1, wherein the array is divided into a plurality of portions, each portion of the plurality of portions being operable at a respective ECC correction power, and wherein a portion corresponds to one of a codeword, a bank, a bank group, a section of the array, the entire array, a buffer, and a page.

12. The memory device claim 1, wherein the circuit portions of the syndrome generating unit comprise a plurality of exclusive OR circuits.

13. A method for operating an array of memory cells, the method comprising:
storing user data in a plurality of memory cells of the memory array;
storing parity data associated with the user data in a number of parity cells of the memory array; and
calculating an ECC syndrome from the stored user data and parity data, wherein the ECC syndrome comprises one or more syndrome portions,
wherein calculating the ECC syndrome comprises:
calculating a first syndrome portion; and
based on the calculated first syndrome portion, deciding whether to calculate or not to calculate a second syndrome portion.

14. The method of claim 13, comprising calculating the second syndrome portion if the first syndrome portion has a least one value different from zero.

15. The method of claim 13, comprising selecting the first syndrome portion to be calculated based on a target ECC.

16. The method of claim 15, wherein calculating the first syndrome portion comprises calculating only part of the whole first syndrome portion that would be required for a given target ECC correction power.

17. The method of claim 13, comprising determining a number of errors in the data based on calculated the ECC syndrome portion, wherein, if at least one second syndrome portion is calculated after the first syndrome portion, the number of errors is determined based on a combination of all the calculated syndrome portions.

18. The method of claim 13, wherein the ECC syndrome is calculated by a syndrome generating unit comprising a plurality of circuit portions, each circuit portion being activable to calculate a respective syndrome portion, wherein calculating the ECC syndrome comprises:
   activating a first circuit portion of the syndrome generating unit for calculating the first syndrome portion; and
   based on the calculated first syndrome portion, deciding whether to activate or not to activate a second circuit portion for the calculation of the second syndrome portion.

19. The method of claim 13, comprising sending the calculated syndrome to a syndrome decoding unit and implementing an ECC operation via said syndrome decoder, the method further comprising selectively activating one or more circuit portions of the syndrome decoder based on a determined number of errors, each circuit portion performing a respective ECC operation on the stored data, so as to select an ECC correction capability of the plurality of ECC correction capabilities on the basis of the determined number of errors.

20. A memory device comprising:
   an array including a plurality of memory cells; and
   a controller configured to:
      store user data in a plurality of memory cells of the memory array;
      store parity data associated with the user data in a number of parity cells of the memory array; and
      calculate an ECC syndrome from the stored user data and parity data,
   wherein the controller comprises a plurality of circuit portions, each circuit portion being configured to calculate a respective syndrome portion of the ECC syndrome, and wherein the controller is further configured to:
      activate a first circuit portion of the syndrome generating unit for calculating a first syndrome portion based on a target ECC correction power; and
      if the first syndrome portion has a least one value different from zero, activate a second circuit portion for the calculation of a second syndrome portion.

21. The memory device of claim 20, comprising a logic unit configured to evaluate the first syndrome portion and a selector element for selectively enabling one or more circuit portions based on the evaluation of the logic unit.

22. The memory device of claim 20, comprising an error unit configured to determine a number of errors in the data based on calculated the ECC syndrome portion, wherein, if at least one second circuit portion is activated after the first circuit portion, the error unit is configured to the determine the number of errors based on a combination of all the calculated portions.

23. The memory device of claim 20, wherein the controller is configured to calculate only part of the whole first syndrome portion that would be required for the given target ECC correction power.

* * * * *